April 2, 1968 TATSUMI OKAMOTO ETAL 3,376,151
METHOD OF FORMING RESIN LINING INSIDE A METAL PIPE
Filed March 4, 1964
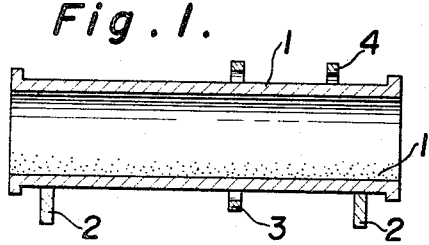
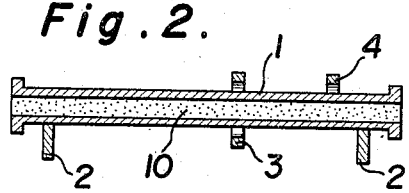
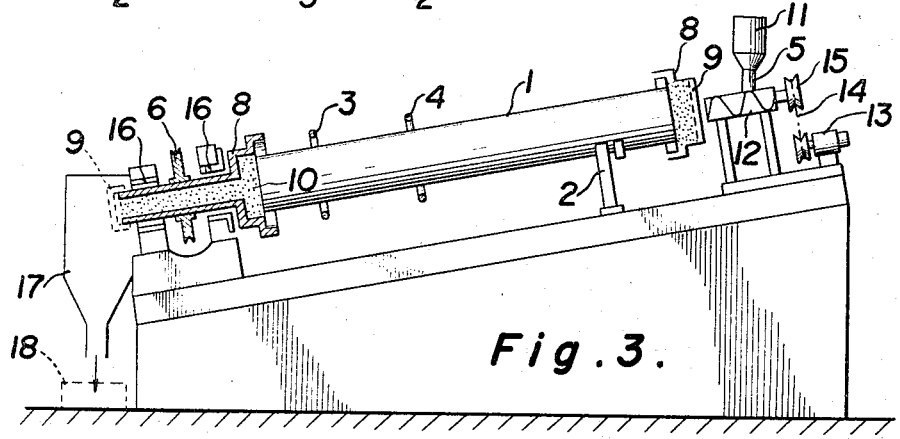
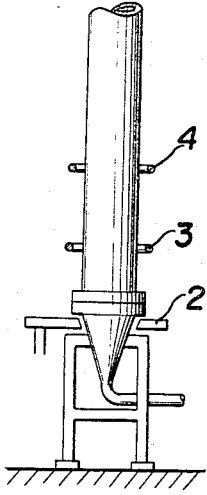
INVENTORS.
TATSUMI OKAMOTO
ATSUO HIRAYAMA
SHUMPEI KAWANAMI
YOSHIHIRO NISHIKAWA
ATTORNEY

United States Patent Office 3,376,151
Patented Apr. 2, 1968

3,376,151
METHOD OF FORMING RESIN LINING INSIDE A METAL PIPE
Tatsumi Okamoto, 914 Totsuhon-machi, Kakura-ku, Kitakyushu-shi, Japan; and Atsuo Hirayama, 248-13 Ooi-Hayashi-cho, Shinagawa-ku; Shumpei Kawanami, 1109 Higashi-Oizumi-cho, Nerima-ku; and Yoshihiro Nishikawa, 130-1 Kamihoyashinden, Hoya-cho, Kita-Tama-gun, all of Tokyo, Japan
Filed Mar. 4, 1964, Ser. No. 349,313
4 Claims. (Cl. 117—18)

ABSTRACT OF THE DISCLOSURE

Method of coating the interior of a long metal pipe with thermoplastic resin which comprises rotating the pipe in tilted disposition while feeding coating resin into the upper end, simultaneously heating the pipe externally and cooling the pipe in spaced relation to the heating, the simultaneous heating and cooling action being advanced downwardly along the pipe to spirally line the interior of the pipe.

---

The present invention relates to improvements in a method of forming resin lining inside metal pipes.

An object of the invention is the provision of a method whereby a resin lining inside a long metal pipe may be surely and easily formed. Previously, it has been considered difficult to provide such a lining.

It has been difficult to evenly heat every part of a long pipe for the purpose of forming a lining inside the pipe. A thermo-plastic resin compound inside the pipe is heated up to different temperatures, thus forming an uneven thickness of the resin lining and also forming a rough inner surface such as granular, netty, and the like, so that the resulting pipe has such a drawback that it is unsuitable to use for transporting liquid chemicals and the like.

In accordance with this invention, a pipe inside which a lining is to be formed is rotated. While rotating the pipe, a thermo-plastic resin compound is admitted into the pipe and permitted to stay there. A porton of the pipe is then heated externally by a heating means, while rotating the pipe. At the same time, the pipe and the heating means are moved axially relatively to each other.

It has been found experimentally that, in order to prevent the compound within the pipe from a sudden increase in temperature, it is necessary to insert a larger quantity of compound within the pipe being heated than is actually required to form the lining. The quantity inserted is more than twice the quantity which is to be converted into the body of the lining. When the pipe is too small in diameter to satisfy the above condition, it is necessary to fill the pipe with the compound. On the other hand, when the pipe is larger in diameter, the quantity which is twice the quantity to be converted into the body of the lining is too small. In this case, a quantity of compound more than ten percent of the volume inside the pipe is required.

The invention will be described further, by way of example, with reference to the accompanying drawings, in which:

FIG. 1 is a schematic sectional view of a pipe, large in diameter, under formation of lining in accordance with an embodiment of the invention;

FIG. 2 is a similar view to FIG. 1 but showing a pipe smaller in diameter;

FIG. 3 is a schematic view of another embodiment in which a pipe under formation of lining is inclined; and FIG. 4 is a schematic view of still another embodiment in which a pipe under formation of lining is arranged vertically.

Referring more particularly to the drawings, the preferred embodiments of this invention will now be desribed; however this description will be understood to be illustrative of the invention and not as limiting it to the particular methods shown and described. There is a pipe 1 inside which a lining is to be formed. It is large in diameter as shown in FIG. 1. A quantity of a thermo-plastic synthetic resin compound 10 is fed into the pipe 1 and then the ends of the pipe 1 are closed. The pipe 1 is placed horizontally on rotating means 2 so as to rotate the pipe 1. There is a heating means 3 to heat the pipe 1 externally and a cooling means 4 to cool the pipe 1 externally. By these means the pipe 1 is rotated during heating so as to displace the compound 10 confined within the pipe 1. The heating means 3 and the pipe 1 are moved axially relatively to each other so as to form an annular lining inside a part of the pipe 1 from the compound 10 and the cooling means 4 is also moved axially relatively to the pipe 1 following the heating means 3 so as to cool an excess of the compound 10 rapidly whereby the inside of the pipe 1 is prevented from formation of an excessive thickness of the lining. The cooling means 4 preferably uses water as a coolant.

In this case where the pipe inside which a lining is to be formed is rather large in diameter, the quantity of the compound 10 is more than twice of the quantity of the body of the lining within the pipe 1 and, at the same time, more than ten percent of the whole volume inside the pipe 1.

In an example, a pipe 1 having a length of 550 cm. and an inner diameter of 10 inches is lined with 20 kg. of polyethylene compound conditional on:

Rotation of the pipe 1 _____ r.p.m__ 60
Axial velocity of the heating means 3 and the cooling means 4 relatively to the pipe 1 ___mm./sec__ 50
Heating temperature _____ ° C__ 260
Space between the heating means 3 and the cooling means 4 _____ min.: (3 meters)__ 1

In a case where the pipe 1 inside which the lining is to be formed is of rather small diameter as shown in FIG. 2, a quantity of resin compound 10 which is either more than twice the quantity of that of the lining to be formed inside the pipe 1 or just the quantity with which the inside space of the pipe 1 is filled.

FIG. 3 illustrates another embodimnet of this invention in which the pipe 1 is inclined. Both ends of the pipe 1 are provided with caps 8 closed by closures 9, so as to prevent the pipe 1 from any leakage of the compound 10 durnig heating. There is a compound feeding means 5 comprising a hopper 11 and a screw conveyor 12, and a duct 17 for receiving an excess of the compound 10 and admitting it into a receiver 18. The pipe 1 is rotated by a pulley 6 mounted on the outlet cap 8 and held by bearings 16. The conveyor 12 is driven by a motor 13 through a belt 14. The heating means 3 and the cooling means 4 are moved axially from the top of the pipe 1 to the bottom thereof. The cooling means 4 may be omitted when the thermo-plastic resin compound is to be heated only to a temperature which is not substantially high.

FIG. 4 shows still another embodiment which is similar to the preceding embodiment but in which the pipe 1 is arranged vertically.

While particular embodiments of the invention have been illustrated and described, modifications thereof will readily occur to those skilled in the art. It should be understood therefore that the invention is not limited to the particular methods disclosed.

What we claim is:

1. A method of forming a resin lining inside an elongated metal pipe which comprises rotating the pipe about its longitudinal axis with said axis inclined with respect to the horizontal, feeding a quantity of a thermo-plastic resin compound into the upper end of the pipe while the pipe is being rotated, heating a portion of the pipe externally while the pipe is being rotated so as to melt the resin compound therein and simultaneously cooling a portion of the pipe immediately adjacent and behind the heated portion to set the resin, advancing the pipe heating and cooling actions axially relatively to the pipe such that they move from one end of the pipe to the other thereof as the pipe is rotated, whereby the pipe is spirally lined with resin, turns of the resin being overlapped so as to form an even lining.

2. A method of forming a resin lining inside a metal pipe which comprises rotating the pipe about its longitudinal axis with said axis inclined with respect to the horizontal, feeding a quantity of a resin compound into the pipe while the pipe is being rotated, the quantity of the resin being at least ten percent of the whole volume of the pipe and at least twice as heavy as the desired weight of the lining, heating a portion of the pipe externally at a predetermined location while the pipe is being rotated so as to melt the resin compound therein and simultaneously cooling a portion of the pipe in spaced relation to the heated location, and advancing the heating and cooling axially relatively to the pipe such that the heating and cooling actions are moved from one end of the pipe to the other end thereof while the pipe is being rotated, whereby the pipe is spirally lined with resin, turns of the resin being overlapped so as to form an even lining.

3. A method of forming a resin lining inside a metal pipe which comprises rotating the pipe about its axis with said axis in a position other than horizontal, feeding a quantity of a resin compound into the pipe, the quantity of resin being such that the pipe is filled with resin, and heating a portion of the pipe externally so as to melt the resin compound therein and simultaneously cooling the portion of the pipe adjacent the heated portion, advancing the heating and cooling along the pipe from the upper end thereof to the lower end thereof while the pipe is being rotated, whereby the pipe is spirally lined with resin, turns of the resin being overlapped so as to form an even lining.

4. A method of forming a resin lining inside a metal pipe which comprises rotating the pipe on its longitudinal axis with said axis in a position other than horizontal, feeding a resin compound into the pipe at the upper end thereof during said rotation and simultaneously exhausting the same out of the pipe at the lower end thereof, heating a portion of the pipe externally during said rotation so as to melt the resin compound and simultaneously cooling the portion of the pipe in spaced relation to the heated portion, and advancing the heating and cooling actions axially along the pipe from the upper end thereof to the lower end thereof while the pipe is being rotated and fed with the resin compound at a rate such that the pipe is always filled with resin compound, whereby the pipe is spirally lined with resin, turns of the resin being overlapped so as to form an even lining.

References Cited

UNITED STATES PATENTS

| 2,737,461 | 3/1956 | Heisler et al. | 117—97 X |
| 2,880,109 | 3/1959 | Current et al. | 117—18 X |

RALPH S. KENDALL, *Primary Examiner.*